United States Patent
Maruyama

(10) Patent No.: US 8,613,468 B2
(45) Date of Patent: Dec. 24, 2013

(54) SIDE-COLLISION AIRBAG APPARATUS

(75) Inventor: Tatsuya Maruyama, Tokyo (JP)

(73) Assignee: Takata Corporation, Tokyo (JP)

( * ) Notice: Subject to any disclaimer, the term of this patent is extended or adjusted under 35 U.S.C. 154(b) by 58 days.

(21) Appl. No.: 13/162,924

(22) Filed: Jun. 17, 2011

(65) Prior Publication Data
US 2011/0316264 A1 Dec. 29, 2011

(30) Foreign Application Priority Data
Jun. 29, 2010 (JP) ................. 2010-147394

(51) Int. Cl.
*B60R 21/261* (2011.01)

(52) U.S. Cl.
USPC .......... 280/740; 280/742; 280/730.2

(58) Field of Classification Search
USPC ............ 280/740, 736, 742, 730.2, 728.2; 102/530, 531
See application file for complete search history.

(56) References Cited

U.S. PATENT DOCUMENTS

| 7,384,062 B2 * | 6/2008 | Yokoyama et al. | 280/730.2 |
| 2004/0090049 A1 * | 5/2004 | McCann et al. | 280/728.2 |
| 2007/0046006 A1 | 3/2007 | Katsuda et al. | |
| 2007/0284858 A1 * | 12/2007 | Nishimura et al. | 280/729 |
| 2007/0284862 A1 | 12/2007 | Kashiwagi | |
| 2009/0001699 A1 * | 1/2009 | Honold et al. | 280/740 |
| 2009/0072523 A1 | 3/2009 | Yokota | |
| 2009/0212542 A1 * | 8/2009 | Toda et al. | 280/730.2 |
| 2010/0207368 A1 * | 8/2010 | Weyrich | 280/736 |

FOREIGN PATENT DOCUMENTS

| JP | 2007-038712 | 2/2007 |
| JP | 2007-062435 | 3/2007 |
| JP | 2008-018925 | 1/2008 |
| JP | 2009-073232 | 4/2009 |

* cited by examiner

*Primary Examiner* — Keith Frisby
(74) *Attorney, Agent, or Firm* — Foley & Lardner LLP

(57) ABSTRACT

This disclosure discloses a side-collision airbag apparatus comprising: a side-collision airbag; an inflator configured to inject gas; and an inflator holder configured to support the inflator; wherein: the inflator comprises: an inflator main body portion that is substantially cylindrical in shape and produces the gas; an injecting portion that protrudes from a tip end of the inflator main body portion; and a clasp portion positioned between the inflator main body portion and the injecting portion; the inflator holder comprises: a holding portion configured to hold the inflator; and a diffuser portion having a diffuser tube that has a cross-section substantially elliptical in shape; and the diffuser tube comprises a contraction opening at an end portion in an injection direction of the gas, and is provided so that an end portion opposite the injection direction of the gas faces to the radial outer peripheral side of the clasp portion.

7 Claims, 5 Drawing Sheets

[FIG.2D]

SIDE-COLLISION AIRBAG APPARATUS

BACKGROUND OF THE INVENTION

1. Field of the Invention

The present invention relates to a side-collision airbag apparatus for restraining an occupant at the time of a side collision of a vehicle, such as an automobile.

2. Description of the Related Art

There are known side-collision airbag apparatuses configured to inflate a side-collision airbag toward the side portion of an occupant via an inflator and restrain the body of the occupant at the time of a vehicle side collision, lateral overturn, or the like. Examples of side-collision airbags include airbags divided into a pelvis chamber and chest chamber. The injected gas from the inflator is appropriately distributed and introduced into each chamber, causing the airbag to deploy in an inflated state appropriate for each chamber.

With such a side-collision airbag apparatus, there is known a structure wherein the inflator is assembled to the side-collision airbag via an inflator holder (see JP, A, 2009-73232, and JP, A, 2008-18925). According to this prior art, the inflator holder comprises a holding portion that holds the inflator, and a diffuser portion that distributes and supplies gas from the inflator to each chamber of the side-collision airbag. The diffuser portion comprises a diffuser tube that has a cross-section that is circular in shape, and comprises a contraction opening positioned on the tip end side, and another opening positioned on the base end side through which the inflator is inserted. In addition, a gas distribution chamber is formed on the inside of the diffuser tube. The inflator comprises an inflator main body portion having a substantially cylindrical shape, and an injecting portion provided so as to protrude from the tip end of the inflator main body portion.

In the above-described prior art, the tip end side of the inflator main body portion is inserted into the gas distribution chamber inside the diffuser tube, with the inflator held by the holding portion of the inflator holder. At this time, a gap channel is formed between the outer peripheral surface of the inflator main body portion and inner peripheral surface of the diffuser tube. When the gas is injected from the injecting portion of the inflator, the gas in the gas distribution chamber is distributed from the gas distribution chamber to a front-end direction gas flow that flows straight along the injection direction via the contraction opening, and a base-end direction gas flow that is reversed to the opposite direction in the gas distribution chamber and flows toward the base-end direction of the inflator via the gap channel.

SUMMARY OF THE INVENTION

Problem to be Solved by the Invention

In recent years, there has been increased demand for the miniaturization and weight reduction of vehicle components with a view to improve the comfort of the occupant and advance environmental measures. For example, decreasing the axial length of the diffuser tube is an effective way to achieve miniaturization of the axial dimensions of the inflator holder and weight reduction.

Here, a clasp portion is normally provided to the inflator between the inflator main body portion and the injecting portion for ease of handling in the manufacturing process. When the length of the diffuser tube is decreased in an effort to achieve miniaturization and weight reduction as described above, the amount of overlap of the end portion of the diffuser tube and the inflator main body portion (in other words, the length of insertion of the inflator main body into the diffuser portion) decreases, causing the end portion of the diffuser tube to be positioned in the portion of the clasp portion. In this case, the downstream end portion of the gap channel, through which flows the path of the base-end direction gas flow after the above-described reversal, is formed by the space between the end portion of the diffuser tube and the clasp portion.

Nevertheless, the clasp portion is sometimes substantially oval or elliptical in shape to prevent the rolling of the inflator main body portion which is cylindrical in shape. As a result, when the cross-section of the diffuser tube is circular in shape, the shape of the downstream end portion of the gap channel becomes non-uniform in the peripheral direction. This non-uniformity results in the possibility of unstable gas distribution performance of the diffuser. According to the above-described prior art, to avoid such an unstable distribution performance, the amount of overlap of the end portion of the diffuser tube and inflator main body portion is increased. As a result, adequate axial dimension miniaturization and weight reduction of the inflator holder are not achieved.

It is therefore an object of the present invention to provide a side-collision airbag apparatus capable of adequately achieving inflator holder miniaturization and weight reduction.

Means for Solving the Problems

In order to achieve the above-mentioned object, according to the first invention, there is provided a side-collision airbag apparatus comprising a side-collision airbag configured to inflate and deploy toward a side portion of an occupant, an inflator configured to inject gas for inflating and deploying the side-collision airbag, and an inflator holder configured to support the inflator, wherein the inflator comprises an inflator main body portion that is substantially cylindrical in shape and produces the gas, an injecting portion that protrudes from a tip end of the inflator main body portion, and a clasp portion positioned between the inflator main body portion and the injecting portion, the inflator holder comprises a holding portion configured to hold the inflator, and a diffuser portion provided to a tip end portion of the holding portion and having a diffuser tube that has a cross-section substantially elliptical in shape, and the diffuser tube comprises a contraction opening at an end portion in an injection direction of the gas, and is provided so that an end portion opposite the injection direction of the gas faces to the radial outer peripheral side of the clasp portion.

The gas produced in the inflator main body portion of the inflator held by the holding portion of the inflator holder is injected from the injecting portion at the tip end of the inflator main body portion. The injected gas is introduced into the interior of the diffuser tube of the diffuser provided to the tip end portion of the holding portion of the inflator holder. A portion of the gas introduced into the interior of the diffuser tube is discharged outside the diffuser via the contraction opening provided to the end portion in the injection direction of the diffuser tube (first gas flow). The remaining gas introduced into the interior of the diffuser tube is reversed inside the diffuser tube. At this time, according to the first invention, the end portion on the opposite side in the gas injection direction of the diffuser tube is disposed in proximity to the radial outer peripheral side of the clasp portion positioned between the inflator main body portion of the inflator and the injecting portion. As a result, the gas reversed as described above enters the gap channel formed between the clasp portion and the end portion of the diffuser tube, and discharges outside the diffuser via the gap channel (second gas flow).

Then, according to the first invention, the cross-section of the diffuser tube is substantially elliptical in shape. With this arrangement, even if the clasp is formed in a substantially oval or elliptical shape for ease of handling during the manufacturing process, the gap channel formed between the clasp and end portion of the diffuser tube can form a substantially uniform shape in the peripheral direction. As a result, unlike the structure of prior art which did not allow proximity between the end portion of the diffuser and the clasp portion in order to ensure the uniformity of the gap channel and thus exhibited difficulties in axial dimension miniaturization of the inflator holder, the present invention makes it possible to achieve adequate miniaturization and weight reduction of the inflator holder.

According to the second invention, in the side-collision airbag apparatus according to the first invention, the diffuser tube comprises the cross-section that is elliptical in shape, having a shorter axis in a direction orthogonal to an inflator holding surface of the holding portion.

In many cases, there is increased demand for an inflator holder that is generally more compact in size in the height direction (the direction orthogonal to the inflator holding surface of the holding portion). According to the second invention, the size in the height direction of the overall inflator holder can be suppressed to achieve a more compact size in the height direction.

According to the third invention, in the side-collision airbag apparatus according to the first invention, the holding portion comprises a stopper configured to regulate the movement of the inflator in a direction opposite the injection direction of the gas.

With this arrangement, it is possible to regulate the movement of the inflator in the base end direction which is caused by the reaction from gas injection.

According to the fourth invention, in the side-collision airbag apparatus according to the third invention, the stopper comprises a bent portion wherein an end portion of the holding portion in the direction opposite the injection direction of the gas is bent, and a bead provided to the bent portion.

According to the fourth invention, the function of regulating the movement of the inflator can be integrated with the holding portion by a bending mechanism. In such a case, a bead is provided to a bent portion, making it possible to strengthen the above-described movement regulating function and reliably regulate the movement of the inflator. Further, the bead makes it possible to suppress the thickness dimension required by the movement regulating function, making it possible to achieve weight reduction in the inflator holder as well. Furthermore, the edge of a steel sheet used for a plate-shaped holding portion is bent to form a stopper portion, thereby making it possible to machine the stopper as a part of the machining process used to form the holding portion by, for example, press working the steel sheet.

Advantages

According to the present invention, it is possible to adequately achieve miniaturization and weight reduction of the inflator holder.

BRIEF DESCRIPTION OF THE DRAWINGS

FIG. 2D is an explanatory view showing the end surface shape of the clasp portion in a comparison example.

DETAILED DESCRIPTION OF PREFERRED EMBODIMENTS

An embodiment of the present invention will now be described with reference to accompanying drawings.

Figure 1:
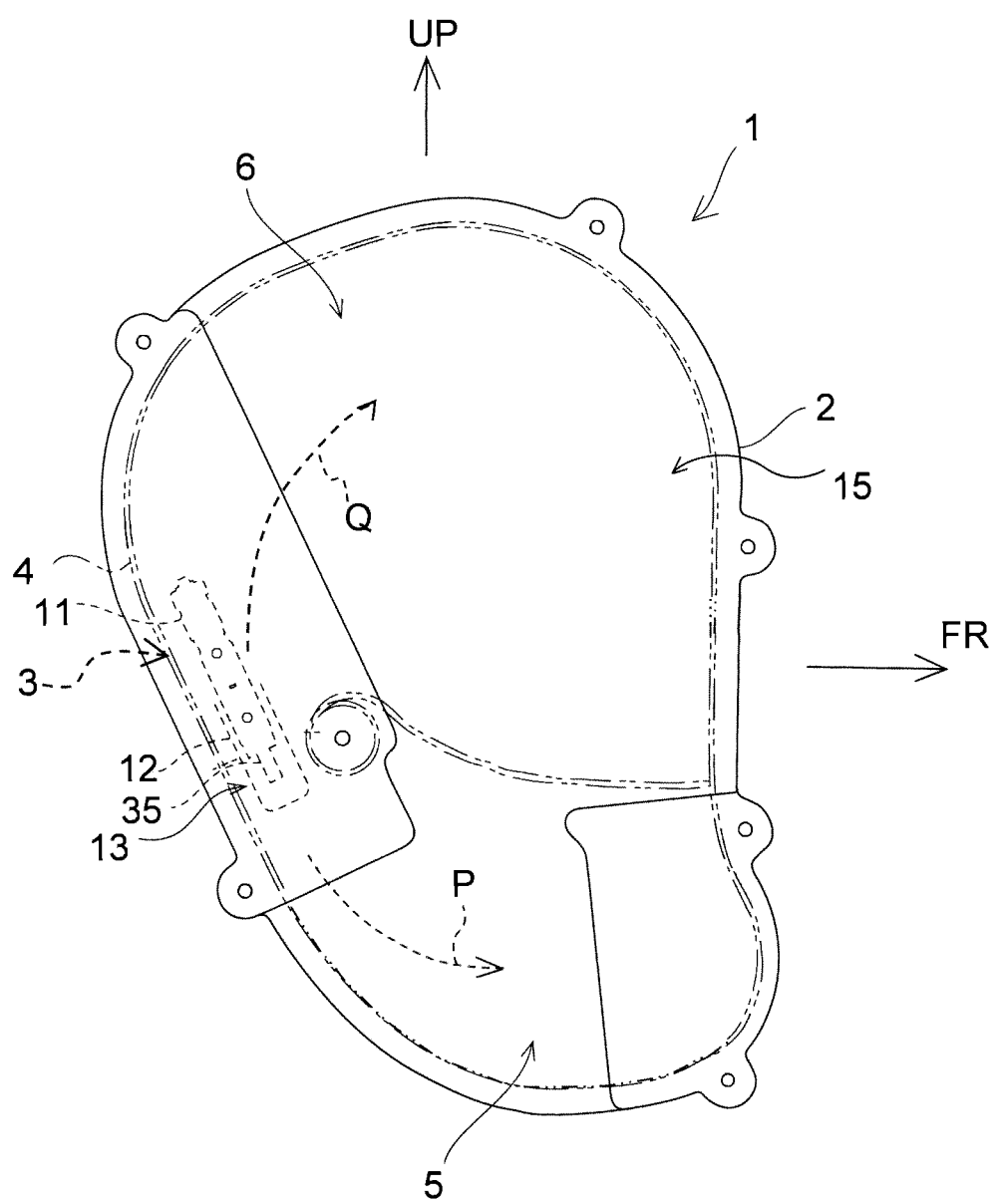
FIG. 1 is a diagram showing a side-collision airbag apparatus according to an embodiment of the present invention.

FIG. 1 shows the configuration of a side-collision airbag apparatus 1 of this embodiment. The figure shows the inflated and deployed state of a side-collision airbag 2. In FIG. 1, arrow FR indicates the frontward direction of the vehicle, and arrow UP indicates the upward direction of the vehicle.

As shown in FIG. 1, the side-collision airbag apparatus 1 comprises the side-collision airbag 2 and an inflator assembly 3 assembled to the side-collision airbag 2. The side-collision airbag apparatus 1 further comprises an inflator control circuit that includes a collision detection system, and harnesses, etc., configured to input a control signal from the inflator control circuit to the inflator assembly 3 (not shown).

The side-collision airbag 2 is formed into a bag body by stitching two base cloths cut into the same shape across the entire periphery at a seam portion 4 along respective outer edge portions. The interior of the bag body of the side-collision airbag 2 is divided into multiple chambers. Specifically, the side-collision airbag 2 comprises a pelvis chamber 5 for restraining the pelvis portion of an occupant (not shown) at the time of inflation and deployment, and a chest chamber 6 for restraining the chest portion of an occupant at the time of inflation and deployment.

The inflator assembly 3 comprises an inflator 11 and an inflator holder 12 configured to hold the inflator 11. This inflator assembly 3 is incorporated in the side-collision airbag 2 on a continuous path 13 that links the chest chamber 6 and the pelvis chamber 5. The inflator 11 injects high-pressure gas when activated (described in details later). This injected high-pressure gas is distributed into a first gas flow P and a second gas flow Q in the inflator holder 12. The first gas flow P enters, inflates, and deploys the pelvis chamber 5. The second gas flow Q enters, inflates, and deploys the chest chamber 6.

Figure 2A:
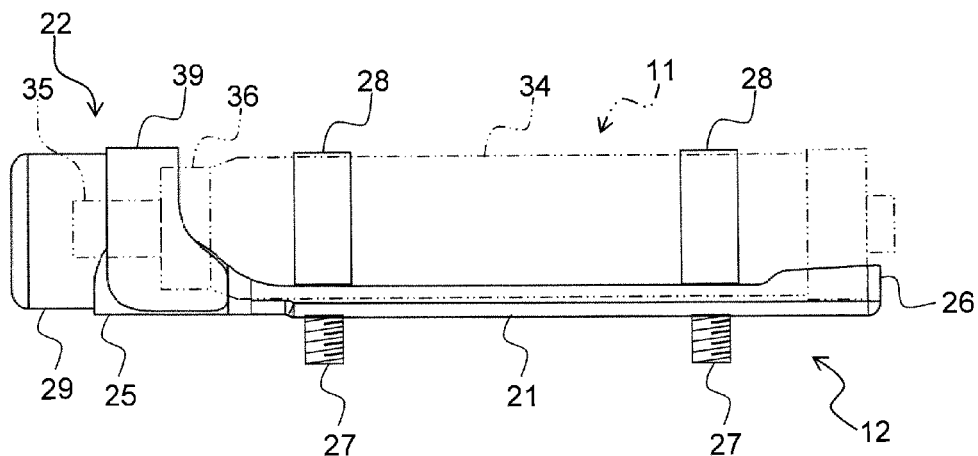
FIG. 2A is a side view showing the inflator holder as viewed from the direction orthogonal to the axial direction.
Figure 2B:
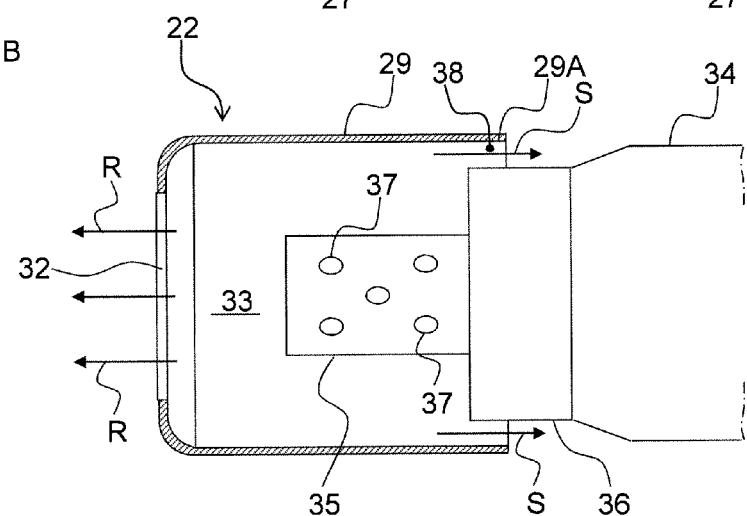
FIG. 2B is a longitudinal cross-sectional view showing an enlarged view of the relationship between the diffuser portion and inflator tip end portion.
Figure 2C:
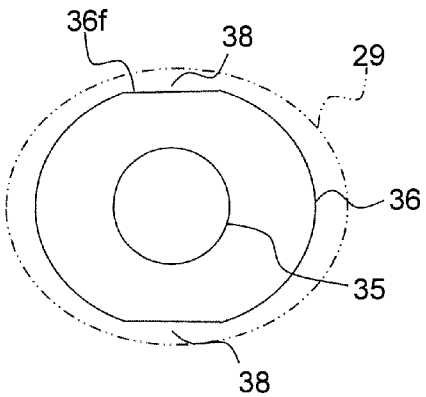
FIG. 2C is an explanatory view showing the end surface shape of the clasp portion.
Figure 2C:
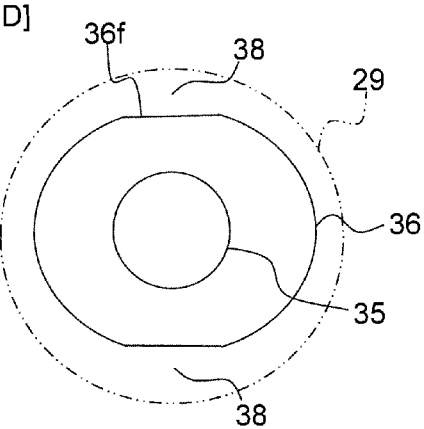
Figure 3:
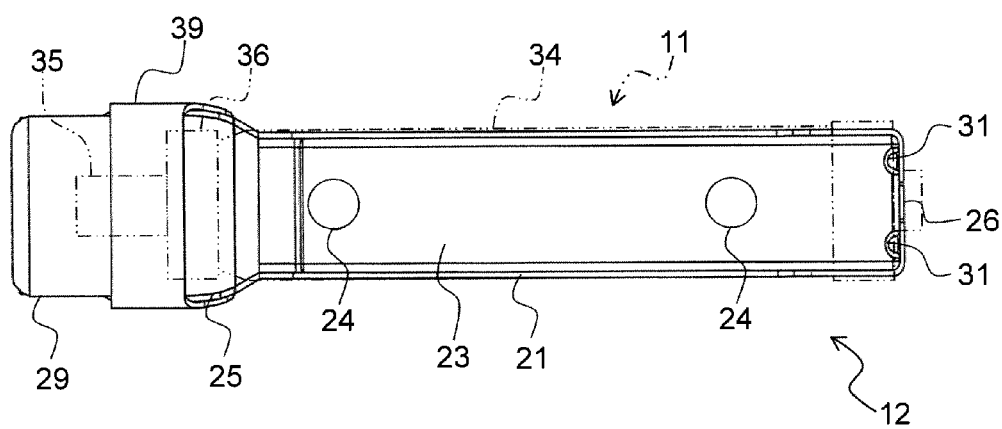
FIG. 3 is a top view showing the inflator holder as viewed from another direction orthogonal to the axial direction.
Figure 4:
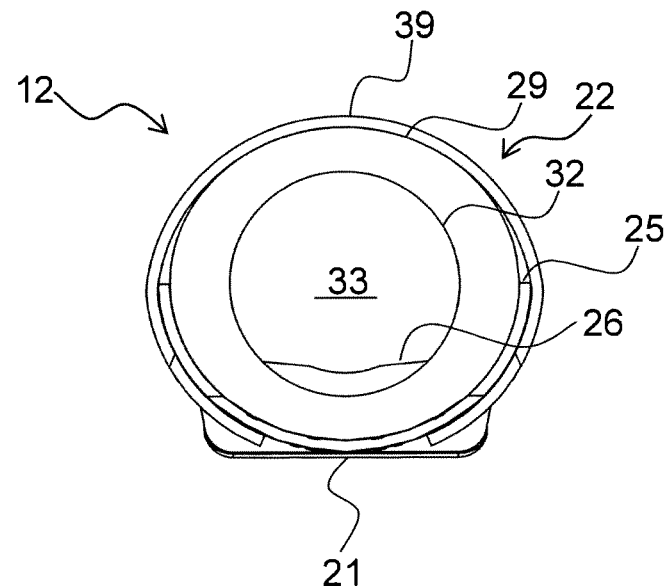
FIG. 4 is a diagram showing the inflator holder as viewed from the tip end side in the axial direction.
Figure 5:
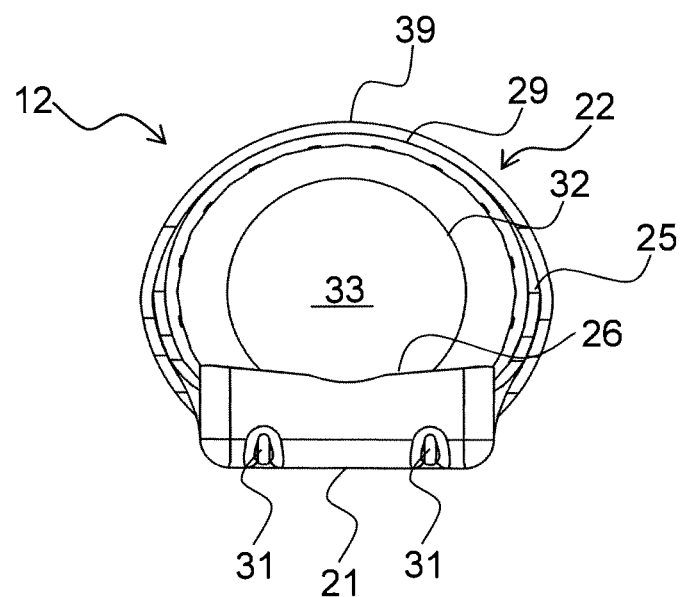
FIG. 5 is a diagram showing the inflator holder as viewed from the base end side in the axial direction.
Figure 6:
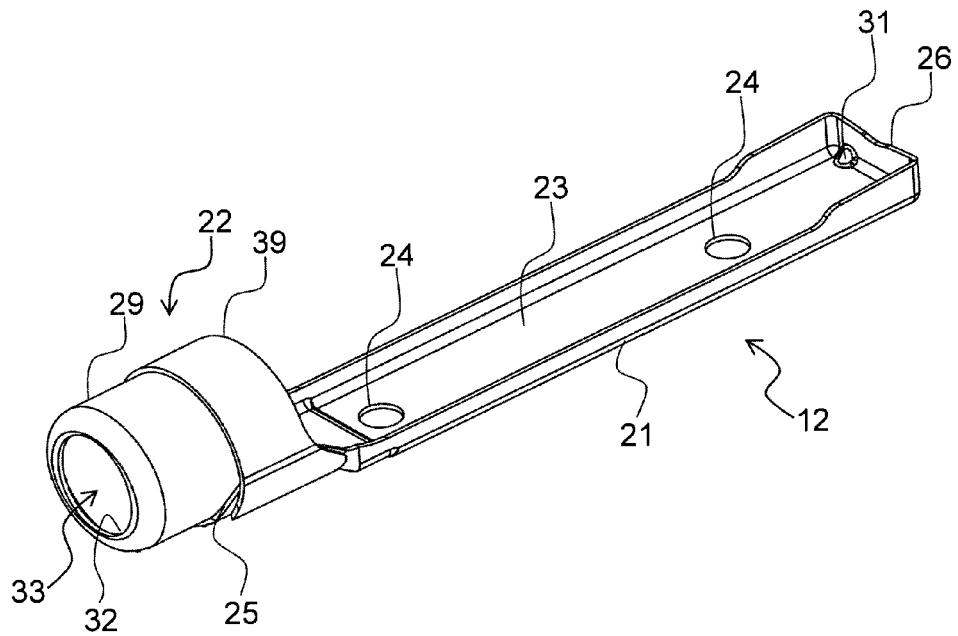
FIG. 6 is a perspective view showing the overall structure of the inflator holder.
Figure 7:
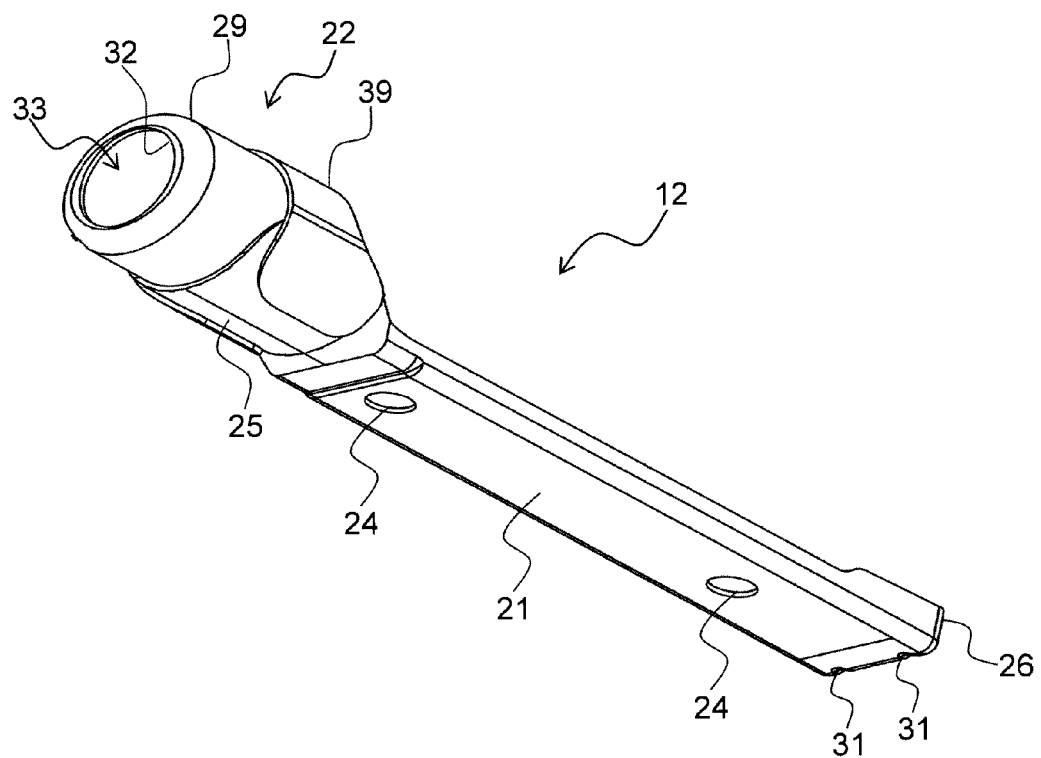
FIG. 7 is a perspective view showing the lower structure of the inflator holder.

Next, the details of the inflator holder 12 of the inflator assembly 3 will now be described in detail with reference to FIG. 2 to FIG. 7. FIG. 2A is a side view showing the inflator holder 12 as viewed in a direction orthogonal to the axial direction, and FIG. 2B is an enlarged, longitudinal cross-sectional view showing the relationship between a diffuser portion 22 of the inflator holder 12 and the tip end portion of the inflator 11. FIG. 2C is an explanatory view showing the end surface shape of the clasp portion 36 on the tip end portion of the inflator 11, and FIG. 2D is an explanatory view showing the end surface shape of the clasp portion 36 in a comparison example. FIG. 3 is a top view showing the inflator holder 12 as viewed from another direction orthogonal to the axial direction, FIG. 4 is a diagram showing the inflator holder 12 as viewed from the tip end side in the axial direction, and FIG. 5 is a diagram showing the inflator holder 12 as viewed from a base end side in the axial direction. FIG. 6 is a diagram showing the inflator holder 12 in a perspective view, and FIG. 7 is a diagram showing the inflator holder 12 in a perspective view from another direction.

As shown in FIG. 2 to FIG. 7, the inflator holder 12 comprises a holding portion 21 and the diffuser portion 22. The holding portion 21 is a region that holds the inflator 11, and is formed by press molding a steel sheet into a plate shape. The holding portion 21 comprises an inflator holding surface 23 (see FIG. 3 and FIG. 6) of a rectangular shape and a length that is substantially equivalent to that of the inflator 11. Two bolt holes 24 are provided to the inflator holding surface 23. A diffuser receptacle 25 is provided on the tip end portion of the inflator holding surface 23, and a stopper 26 is provided on the base end portion of the inflator holding surface 23.

Through each of the bolt holes 24 passes a securing bolt 27 for securing the inflator holder 12 to a predetermined securing target. The securing bolt 27 is joined with a band-shaped clip 28 (not shown in any figure other than FIG. 2) for securing the inflator 11 to the inflator holding surface 23 of the holding portion 21. Thus, the inflator 11 of the inflator assembly 3 is secured to the inflator holding surface 23 by the clip 28 and held by the inflator holder 12, and secured to a predetermined securing target via the holding of the inflator holder 12.

The diffuser receptacle 25 comprises a curved surface that follows the outer peripheral surface of a diffuser tube 29 provided to the diffuser portion 22. With this arrangement, the diffuser receptacle 25 supports the diffuser tube 29 in a state of partial contact. The diffuser tube 29 is securely assembled by spot welding to the diffuser receptacle 25, causing the diffuser portion 22 to form the tip end portion of the holding portion 21. A cover 39 of a headband shape for reinforcing the diffuser tube 29 is provided to the outer peripheral side of the diffuser receptacle 25. The diffuser portion 22 is positioned between this cover 39 and the diffuser receptacle 25, thereby improving the impact resistance of the diffuser portion 22.

The stopper 26 is formed as a bent portion provided to the base end portion of the holding portion 21, that is, by bending the edge of the steel sheet used to form the holding portion 21. A bead 31 is formed in two locations on the bent portion of the stopper 26. Each of the beads 31 is formed to cross the machined line of the bend of the bent portion. The stopper 26 contacts the base end portion of the inflator 11 when the inflator 11 attempts to move in the base end side direction in reaction to the injection of the high-pressure gas, thereby preventing movement of the inflator 11 in the base end side direction. At this time, although a bending load is applied from the inflator 11 to the stopper 26, the bending resistance with respect to this bending load is improved by the beads 31.

The diffuser portion 22 is formed by securely assembling the diffuser tube 29 to the diffuser receptacle 25 of the holding portion 21, as described above. This diffuser portion 22 distributes the high-pressure gas injected from the inflator 11 into a gas flow R, which is equivalent to the first gas flow P (see FIG. 1), and a gas flow S, which is equivalent to the second gas flow Q (see FIG. 1).

The diffuser tube 29 is provided with a contraction opening 32 on the tip end, and is in an open state for insertion of the tip end of the inflator 11 on the base end. The interior of the diffuser tube 29 forms a gas distribution chamber 33. This diffuser tube 29 is a tube having a cross-section that is elliptical in shape, with the shorter axis of the elliptical shape in a direction orthogonal to the inflator holding surface 23 of the holding portion 21.

The inflator 11 comprises a cylindrical main body portion 34 filled with a gas forming agent, an injecting portion 35 that is cylindrical in shape with a smaller diameter than the main body portion 34 and protrudes from the tip end of the main body portion 34, and a clasp portion 36 positioned between the main body portion 34 and the injecting portion 35. A plurality of injection holes 37 (see FIG. 2B) is formed on the lateral surface of the injecting portion 35. The clasp portion 36 is formed into a substantially elliptical or oval shape for ease of handling (roll prevention) in the manufacturing process of the inflator 11.

In addition, the tip end portion of the main body portion 34 of the inflator 11 enters the interior of the of the diffuser tube 29, that is, the gas distribution chamber 33, when the inflator 11 is held on the inflator holding surface 23 of the holding portion 21 as described above. At this time, an end portion 29A of the diffuser tube 29 is disposed near the radial outer peripheral side of the clasp portion 36, and a gap channel 38 is formed between the end portion 29A and the clasp portion 36 (in other words, between the outer peripheral surface of the main body portion 34 and the inner peripheral surface of the diffuser tube 29). Then, when high-pressure gas is produced in the main body portion 34 at the time of activation, the high-pressure gas is injected from the injection holes 37 of the injecting portion 35 into the gas distribution chamber 33. The injected high-pressure gas is distributed by the distribution function of the gas distribution chamber 33 into the gas flow R that flows from the contraction opening 32 to the outside, and the gas flow S that reverses inside the gas distribution chamber 33 and flows through and out the gap channel 38. Then, the gas flow R enters the pelvis chamber 5 as the first gas flow P in FIG. 1, and the gas flow S enters the chest chamber 6 as the second gas flow Q in FIG. 1.

In this embodiment configured as described above, the cross-section of the diffuser tube 29 is substantially elliptical in shape. With this arrangement, as shown in FIG. 2C, the gap channel 38 formed between the clasp portion 36 and the end portion 29A of the diffuser tube 29 in a substantially oval or elliptical shape achieves a shape that is substantial uniform in the peripheral direction. FIG. 2D shows a comparison example corresponding to a case where the diffuser tube 29 is circular in shape with the same diameter as that in FIG. 2C. Upon comparison with FIG. 2D, it is understood that the gap channel 38 in the embodiment shown in FIG. 2C is substantially uniform across the entire periphery in the peripheral direction. As a result, according to this embodiment, unlike the structure of prior art which could not allow the end portion of the diffuser facing to the clasp portion in order to ensure the uniformity of the gap channel, and thus exhibited difficulties in axial dimension miniaturization of the inflator holder, it is possible to achieve adequate miniaturization and weight reduction of the inflator holder 12.

Further, in many cases there has been increased demand for the inflator holder 12 to be more compact in size in the height direction (the direction orthogonal to the inflator holding surface 23 of the holding portion 21). According to this embodiment, the diffuser tube 29 comprises a cross-section that is elliptical in shape, having a shorter axis in the direction orthogonal to the inflator holding surface 23 of the holding portion 21. With this arrangement, the size in the height direction of the overall inflator holder 12 can be suppressed to achieve a more compact size in the height direction.

Further, in this embodiment, the stopper 26 forms a structure comprising the bead 31 in the bent portion wherein the end portion opposite the gas injection direction of the holding portion 21 is bent. With this arrangement, the function of regulating the movement of the inflator 11 can be integrated with the holding portion 21 by a bent structure. The bead 31 is then provided, strengthening the movement regulating function and making it possible to reliably regulate the movement of the inflator 11. Further, with the bead 31, the thickness dimension required by the movement regulating function can be suppressed, making it possible to reduce the weight of the inflator holder 12 as well. Furthermore, the edge of the steel sheet used for the plate-shaped holding portion 21 is bent to form the stopper 26, thereby making it possible to machine the stopper 26 as a part of the machining process for forming the holding portion by, for example, press working the steel sheet.

While the above has described an illustrative scenario in which the present invention was applied to the side-collision airbag apparatus 1 configured to inflate and deploy between the apparatus and the occupant on the side-collision side (the so-called "near side") of the vehicle, the present invention is not limited thereto. That is, the side-collision airbag apparatus 1 can be applied to an airbag that inflates and deploys on the opposite side (the so-called "far side") across from the occupant, and achieve the same advantages.

Although this invention has been described merely by way of example using the embodiment above, it is to be appreciated that various modifications may be made thereto without departing from the spirit or scope of the invention. For example, while the present invention was applied to a side-collision airbag apparatus in the above embodiment, the present invention allows application to any airbag apparatus, regardless of type, that is capable of utilizing the function of the inflator holder according to the present invention.

What is claimed is:

1. A side-collision airbag apparatus comprising:
    a side-collision airbag configured to inflate and deploy toward a side portion of an occupant;
    an inflator configured to inject gas for inflating and deploying said side-collision airbag; and
    an inflator holder configured to support said inflator;
    wherein:
    said inflator comprises:
        an inflator main body portion that is substantially cylindrical in shape and produces said gas;
        an injecting portion that protrudes from a tip end of said inflator main body portion; and
        a clasp portion positioned between said inflator main body portion and said injecting portion;
    said inflator holder comprises:
        a holding portion configured to hold said inflator; and
        a diffuser portion provided to a tip end portion of said holding portion, said diffuser portion including a diffuser receptacle, a cover and a diffuser tube contained between said diffuser receptacle and said cover, said diffuser tube having a cross-section substantially elliptical in shape;
    wherein said holding portion, said diffuser receptacle, said cover and said diffuser tube are formed into a single piece, and
    wherein said diffuser tube comprises a contraction opening at an end portion in an injection direction of said gas, and is provided so that an end portion opposite the injection direction of said gas faces to a radial outer peripheral side of said clasp portion.

2. The side-collision airbag apparatus according to claim 1, wherein:
    said diffuser tube comprises said cross-section that is elliptical in shape, having a shorter axis in a direction orthogonal to an inflator holding surface of said holding portion, and
    an outline of said clasp portion is a substantially oval or elliptical shape in accordance with the cross-section of said diffuser tube having an elliptical shape.

3. The side-collision airbag apparatus according to claim 1, wherein:
    said holding portion comprises a stopper configured to regulate the movement of said inflator in a direction opposite the injection direction of said gas.

4. The side-collision airbag apparatus according to claim 3, wherein:
    said stopper comprises:
        a bent portion wherein an end portion of said holding portion in the direction opposite the injection direction of said gas is bent; and
        a bead provided to said bent portion.

5. The side-collision airbag apparatus according to claim 1, wherein the holding portion includes a rectangular base and two sidewalls, each having a length that is substantially equivalent to a length of said inflator.

6. The side-collision airbag apparatus according to claim 1, wherein said diffuser receptacle includes a curved surface that follows an outer peripheral surface of said diffuser tube such that said diffuser receptacle is configured to support said diffuser tube in a state of partial contact.

7. The side-collision airbag apparatus according to claim 1, wherein said cover is provided at an outer peripheral side of said diffuser receptacle and configured to reinforce said diffuser tube.

* * * * *